(12) United States Patent
Adams et al.

(10) Patent No.: US 7,873,711 B2
(45) Date of Patent: Jan. 18, 2011

(54) METHOD, SYSTEM AND PROGRAM PRODUCT FOR MANAGING ASSIGNMENT OF MAC ADDRESSES IN A VIRTUAL MACHINE ENVIRONMENT

(75) Inventors: Tracy J. Adams, Endicott, NY (US); Mary Ellen Carollo, Ithaca, NY (US); Susan M. Farrell, Binghampton, NY (US); Angelo Macchiano, Apalachin, NY (US); Dennis R. Musselwhite, Hallstead, PA (US); Richard P. Tarcza, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/163,113

(22) Filed: Jun. 27, 2008

(65) Prior Publication Data

US 2009/0327462 A1 Dec. 31, 2009

(51) Int. Cl.
*G06F 15/173* (2006.01)
(52) U.S. Cl. .................. 709/222; 709/232; 709/238; 709/235; 709/220; 709/221; 709/227; 709/226; 711/207; 711/203; 711/200; 711/163; 718/1; 718/101
(58) Field of Classification Search .......... 709/222, 709/232, 238, 235, 220, 227, 226
See application file for complete search history.

(56) References Cited

U.S. PATENT DOCUMENTS

| 6,609,152 | B1 | 8/2003 | Ono |
| 6,928,478 | B1 | 8/2005 | Gangadharan |
| 7,356,818 | B2 | 4/2008 | Carollo et al. |
| 7,444,405 | B2 * | 10/2008 | Gangadharan ............... 709/226 |
| 2004/0141468 | A1 | 7/2004 | Christensen et al. |
| 2005/0163123 | A1 * | 7/2005 | Gangadharan ............... 370/392 |
| 2006/0123204 | A1 * | 6/2006 | Brown et al. ................ 711/153 |
| 2007/0073882 | A1 * | 3/2007 | Brown et al. ................ 709/226 |

* cited by examiner

*Primary Examiner*—Jude J Jean Gilles
(74) *Attorney, Agent, or Firm*—Dennis Jung; Gerry Monteleone (57) ABSTRACT

A method, system and program product for managing assignment of virtual physical addresses. The method includes requesting, using a services function provided by a virtual machine operating system, a MAC address assignment for a real device and searching, in a MAC assignment table created and stored within a virtual memory space, to determine whether or not an explicit MAC address is assigned to the device. If an explicit MAC address is determined to be assigned to the device, retrieving the explicit MAC address upon verifying that the MAC address is not in use by another device and forwarding, using the services function, the explicit MAC address retrieved for assignment to the real device. If an explicit MAC address is not assigned to the device, retrieving an available MAC address from a MAC address pool table and forwarding the available MAC address retrieved for assignment to the real device.

20 Claims, 6 Drawing Sheets

METHOD, SYSTEM AND PROGRAM PRODUCT FOR MANAGING ASSIGNMENT OF MAC ADDRESSES IN A VIRTUAL MACHINE ENVIRONMENT

FIELD OF THE INVENTION

The present invention relates to computer systems and software, and more specifically to a technique for managing assignment of virtual physical addresses or virtual MAC addresses assigned to devices, in particular, locally-defined virtual physical addresses or virtual MAC addresses assigned to real or tangible devices used by virtual machines in a virtual machine environment.

BACKGROUND OF THE INVENTION

In computing networking, a network card allows computers to communicate over a computer network, such as, the Internet. Typically, a number referred to as the Media Access Control address or MAC address is attached to most network adapters, such as, an Ethernet or network card or a Local Area Network (LAN) card or a Network Interface Card or NIC, to serve as an identifier. A MAC address is a 48-bit network identifier that is "burned in" to a ROM (Read-Only Memory) chip on the NIC to identify the device on the network. The first 24 bits is called the Organizationally Unique Identifier (OUI) and is largely manufacturer dependent. In MAC addresses, the OUI is combined with a 24-bit number to form the address. Thus, a NIC in one computer or network segment will have a different MAC address than a NIC in another computer or network segment, as would an Ethernet adapter in a computer or network segment versus a wireless adapter in the same computer or same network segment. As such, there is a need for innovative and efficient ways to manage MAC addresses, such that, a MAC address that is used by one device is distinct and not the same as a MAC address that is used by another device.

SUMMARY OF THE INVENTION

The present invention resides in a system, method and program product for managing assignment of locally-defined virtual physical addresses or virtual MAC addresses assigned to devices in a virtual machine operating system. The method comprises requesting, using a services function provided by the virtual machine operating system, a virtual physical address assignment for a device dedicated to a virtual machine in the virtual machine operating system, wherein the device comprises a tangible device, and searching, in a virtual physical address assignment table stored within a memory space of the virtual machine operating system, to determine whether or not an explicit virtual physical address is assigned to the device. If the explicit virtual physical address is determined to be assigned to the device, retrieving the explicit virtual physical address from the virtual physical address assignment table upon verifying that the explicit virtual physical address is not in use by another device, and forwarding, using the services function provided by the virtual machine operating system, the explicit virtual physical address retrieved for assignment to the device, wherein the explicit virtual physical address forwarded is assigned to the tangible device dedicated to the virtual machine in the virtual machine operating system. If the explicit virtual physical address is not assigned to the device, the method further comprises retrieving an available virtual physical address from a virtual physical address pool table and forwarding, using the services function, the available virtual physical address retrieved from the virtual physical address pool table to the virtual machine operating system, wherein the available virtual physical address forwarded is assigned to the tangible device dedicated to the virtual machine in the virtual machine operating system. In an embodiment, the tangible device is assigned a virtual device number and the requesting step further comprises starting device initialization for the tangible device using a virtual device driver for the tangible device dedicated to the virtual machine in the virtual machine operating system. In an embodiment, retrieving the explicit virtual physical address from the virtual physical address assignment table step further comprises verifying in the virtual physical address pool table whether or not the explicit virtual physical address is in use by the another device and if the explicit virtual physical address is not in use by the another device, marking in the virtual physical address pool table the explicit virtual physical address as being used by the tangible device before forwarding the explicit virtual physical address to the virtual device driver using the services function provided by the virtual machine operating system. In an embodiment, retrieving the explicit virtual physical address from the virtual physical address assignment table step further comprises verifying in the virtual physical address pool table whether or not the explicit virtual physical address is in use by the another device and if the explicit virtual physical address is in use by the another device, returning an error to the virtual device driver of the virtual machine operating system. In an embodiment, the available virtual physical address retrieved from the virtual physical address pool comprises a system assigned virtual physical address. In an embodiment, retrieving the available virtual physical address from the virtual physical address pool table further comprises determining whether or not the system assigned virtual physical address is available in the virtual physical address pool table and if the system assigned virtual physical address is available, marking in the virtual physical address pool table the system assigned virtual physical address as being used by the device before forwarding the system assigned virtual physical address to the virtual device driver calling routine of the base portion of the virtual machine operating system. In an embodiment, if the system assigned virtual physical address is not available, returning an error to the virtual device driver of the virtual machine operating system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
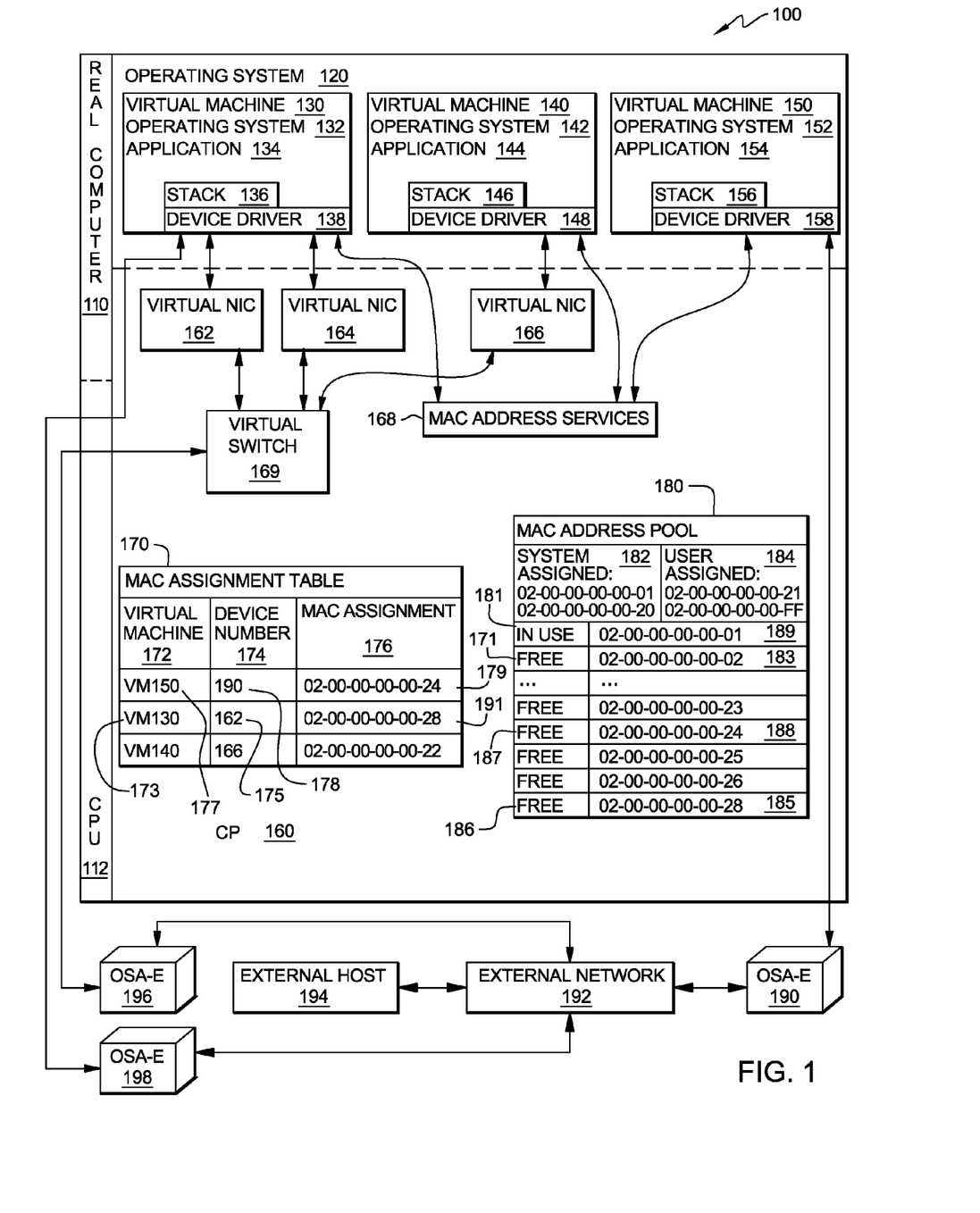
FIG. 1 is a schematic block system diagram illustrating a virtual machine operating system including a control program or a hypervisor for managing assignment of locally-defined virtual physical addresses or virtual MAC addresses in a virtual machine operating system, in accordance with an embodiment of the present invention.

In one embodiment, the invention provides a system for managing assignment of locally-defined virtual physical addresses or virtual MAC addresses assigned to devices, in particular, real or tangible devices attached to virtual machines, as well as virtual devices defined in virtual machines in a virtual machine operating system environment. Reference is now made to FIG. 1, reference numeral 100, which illustrates an embodiment of a system for managing assignment of virtual physical addresses or virtual MAC addresses in a virtual machine operating system, in accordance with an embodiment of the invention. Turning to FIG. 1, a virtual machine operating system 120 comprises a common base portion or control program (CP) or hypervisor, reference numeral 160. The control program or hypervisor defines separate user portions or guests or virtual machines that all run on a physical or real computer by assigning resources (such as, CPU, memory, I/O units, etc.) to each of the virtual machines and by controlling the virtual machines at a high level, for instance, starting and stopping the virtual machines, managing allocation of resources and allowing communication between the virtual machines. In an embodiment, the virtual machine operating system 120 comprises an IBM® zSeries Virtual Machine (IBM z/VM) 5.4.0 virtual machine operating system, that is commercially available from International Business Machines Corporation (IBM), although, it is understood by one skilled in the art that the present invention can be incorporated into other virtual machine operating systems as well. In the virtual machine operating system 120, for instance, an IBM® z/VM operating system, the common base portion 160 is called the Control Program ("CP") or the Hypervisor and each user portion (130, 140 and 150) is called a virtual machine or guest or "user" virtual machine because of the nature of the applications they execute. Each virtual machine is a logical partition of the physical resources of the real computer 110. A guest operating system runs on each virtual machine, and the virtual machine appears to the guest operating system as a real computer. The guest operating system controls execution of applications that execute on the resources assigned to a respective virtual machine. Many applications can run on each guest operating system and its virtual machine. Applications running on different virtual machines can communicate with each other through the common base portion 160. The virtual machine operating system 120 executes in a physical or real computer 110, for instance, an IBM® zSeries mainframe computer. However, the present invention can be incorporated into a virtual machine operating system executing on other server computers or personal computers as well. The real computer 110 further includes a central processing unit or CPU 112. Further, guest operating systems 132, 142 and 152 execute in virtual machines 130, 140 and 150, respectively. In an embodiment, guest operating systems 132, 142 and 152 can comprise a z/OS operating system, a z/VM operating system, a VSE operating system or a Linux (™ of Linus Torvalds) operating system, although other operating systems are feasible also. In an embodiment, the application 154 executing in virtual machine 150 comprises TCP/IP (Transmission Control Protocol/Internet Protocol) for z/VM, operating in Layer 2 (Data Link Layer) of the Open Systems Interface (OSI) reference model. Further, applications 134 and 144 execute in the virtual machines 130 and 140 on operating systems 132 and 142, respectively. For example, applications 134 and 144 can comprise a web server, a mail server or a file server or TCP/IP for z/VM, although other applications are feasible as well. The base portion or control program 160 of the virtual machine operating system 120 supports IP (Internet Protocol) communications in IP Layer 2 (the Data Link Layer) between virtual machines 130, 140 and 150, virtual switch 169 and any other applications running on an external network, such as, a tangible LAN (Local Area Network) 192. Further, as shown in an embodiment in FIG. 1, the system 100 is connected to three real or tangible Network Interface Cards (NICs), reference numerals 190, 196 and 198. In an embodiment, each of the tangible NICs comprises an OSA-E (Open System Adapter-Express) card, and further, in an embodiment, each tangible NIC (OSA-E cards 190, 196 and 198) is shown connected to an external tangible LAN network 192 of the virtual machine operating system 120. However, it is understood by one skilled in the art that one or both of the tangible NICs may comprise other real or tangible network devices and, further, may be connected to other external networks. As shown in FIG. 1, the virtual machines 130 and 140 use simulated or virtual network interface cards (NICs) or devices 162, 164 and 166, which in an embodiment, are configured to communicate via the virtual switch 169 with a real or tangible network device, such as, the OSA-E adapter card 196 in order to access applications running on an external host computer 194 that is connected to a tangible Local Area Network (LAN) 192. Further, in an embodiment shown in FIG. 1, the virtual machine 150 accesses applications running on the external host computer 194 that is connected to the tangible Local Area Network (LAN) 192 using a real or tangible network interface card (NIC), such as, the real or tangible OSA-E adapter card 190. Additionally, in an embodiment shown in FIG. 1, the virtual machine 130 accesses applications running on the external host computer 194 that is connected to the tangible Local Area Network (LAN) 192 using a real or tangible network interface card (NIC), such as, the real or tangible OSA-E adapter card 198. In an embodiment, the virtual switch 169 comprises an IPv4 (Internet Protocol version 4) or IPv6 (Internet Protocol version 6) Layer 2 Virtual Switch, which can be connected (via a tangible OSA-E card) to a physical LAN segment in Layer 2 mode. Although not shown in FIG. 1, there can be many other virtual machines and associated operating systems and applications which also share common base portion 160 of the virtual machine operating system 120. Each guest operating system and virtual machine is capable of concurrently executing a number of different applications. In an embodiment, the control program or base portion 160 of the operating system 120 includes a virtual physical address services function or virtual MAC address services function or subroutine 168, which in an embodiment, is a subroutine or code of the control program 160 that is used by a virtual device driver of a virtual machine to request a locally-defined virtual physical address or virtual MAC address assignment for either a real device dedicated to the virtual machine or a virtual device defined in the virtual machine, as described further herein below and additionally with respect to FIGS. 4A-4B and 5A-5B. In an embodiment, a locally-defined virtual physical address or virtual MAC address is configured for a system, such as, system 100, by a system administrator when setting up virtual machine operating system 120. For example, a system administrator may use the VMLAN MACPREFIX statement in the z/VM operating system configuration file for configuring locally-defined virtual physical addresses or virtual MAC addresses for the virtual machine operating system 120. Further, as shown in FIG. 1, the virtual machines 130, 140 and 150 include respective virtual protocol stacks 136, 146 and 156. In an embodiment, the virtual protocol stacks comprise TCP/IP stacks that are configured to deploy its own unique locally-defined virtual physical address or virtual MAC address, instead of using the internal MAC address that is burned into a tangible NIC, such as, an OSA-E adapter card. In an embodiment, a respective protocol stack stores and processes or manages outgoing messages yet to be sent out and incoming messages yet to be handled by a respective virtual machine. Further, virtual machines 130, 140 and 150 also include respective virtual device drivers 138, 148 and 158. In an embodiment, as shown in FIG. 1, a virtual device driver, for example, virtual device driver 148 may be programmed to be used by a single virtual device, for instance, a virtual Network Interface Card (NIC) card 166 or a device driver (for instance, device driver 138) may be programmed to be used by multiple virtual Network Interface Cards (NIC cards) or devices, such as, virtual NIC 162 and virtual NIC 164 and real or tangible network interface cards (NICs), such as, OSA-E adapter card 198. In particular, as shown in FIG. 1, the device driver 138 in virtual machine 130 is programmed to communicate with both virtual NIC 162 and/or virtual NIC 164, and tangible NIC 198, whereas, the device driver 148 in virtual machine 140 is programmed to communicate only with virtual NIC 166. Furthermore, as shown in FIG. 1, device driver 158 is configured to interface to a real or tangible device, namely, an OSA-E (Open System Adapter-Express) card 190. As such, it is possible for a user application, for instance, application 154 running on a z/VM virtual machine 150 to communicate with another application via the tangible LAN 192, using Internet Protocol. Accordingly, the application 154 can be running on the same or different z/VM base portion or running on another computer system with a different type of operating system altogether. To support this communication, a tangible network interface (NIC) card, such as, an OSA-E adapter card, is provided between the z/VM base portion 160 in the virtual machine operating system 120 and the tangible LAN 192. In an embodiment, the virtual machine operating system utilizes an operating system service provided by the operating system itself, namely, the MAC address services function 168 in the virtual machine operating system 120. As such, requests and assignments for virtual physical addresses or virtual MAC addresses are orchestrated through a system instruction, such as, the Diagnose function issued by the virtual machine residing within the operating system. In an embodiment, the respective device driver code running in the respective virtual machines uses the MAC address Services function 168 to call the Control Program 160 for a service, such as, assigning a virtual physical address or virtual MAC address to a real or tangible device (for instance, an OSA-E adapter card 190) dedicated to a virtual machine 150 or for assigning a virtual physical address or virtual MAC address to a virtual device, for instance, a virtual NIC 162 defined in virtual machine operating system 120. Further, in an embodiment, each protocol stack 136, 146 and 156 comprises a TCP/IP (Transmission Protocol/Internet Protocol) stack, which in an embodiment, is designed to operate in the Data Link Layer 2 of the Open Systems Interconnection (OSI) reference model mode. Further, in an embodiment and in accordance with the invention, each stack is capable of deploying its own unique locally-defined virtual Media Access Control (MAC) addresses, instead of sharing the MAC addresses that are burned into the tangible devices. Accordingly, the guest device driver is able to send and receive, via a respective stack, Ethernet frames (data packets) for transferring data through the OSA feature. In an embodiment, the TCP/IP Layer 2 support applies to an OSA-E (Open System Adapter-Express), OSA-Express2 or OSA-Express3 feature when configured in Queued Direct I/O (QDIO) mode (CHPID (Channel Path ID) type OSD (OSA-Express Direct)). As such, the invention allows connecting a z/VM TCP/IP stack to an IPv4 (Internet Protocol version 4) or IPv6 (Internet Protocol version 6) Layer 2 Virtual Switch, reference numeral 169. Further, a z/VM TCP/IP stack can be connected (via a real OSA-Express card) to a physical LAN segment in Layer 2 mode.

Figure 2:
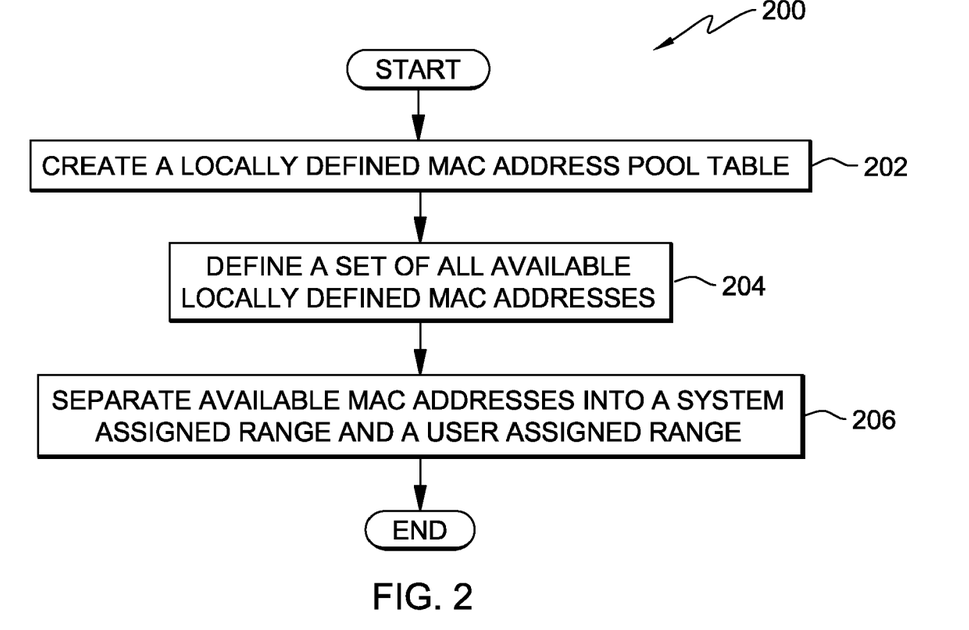
FIG. 2 depicts a flowchart illustrating a process implemented by the virtual machine operating system of FIG. 1 to define or create a virtual physical address or virtual MAC address pool table for managing assignment of locally-defined virtual physical addresses or virtual MAC addresses in a virtual machine operating system, in accordance with an embodiment of the present invention.
Figure 3:
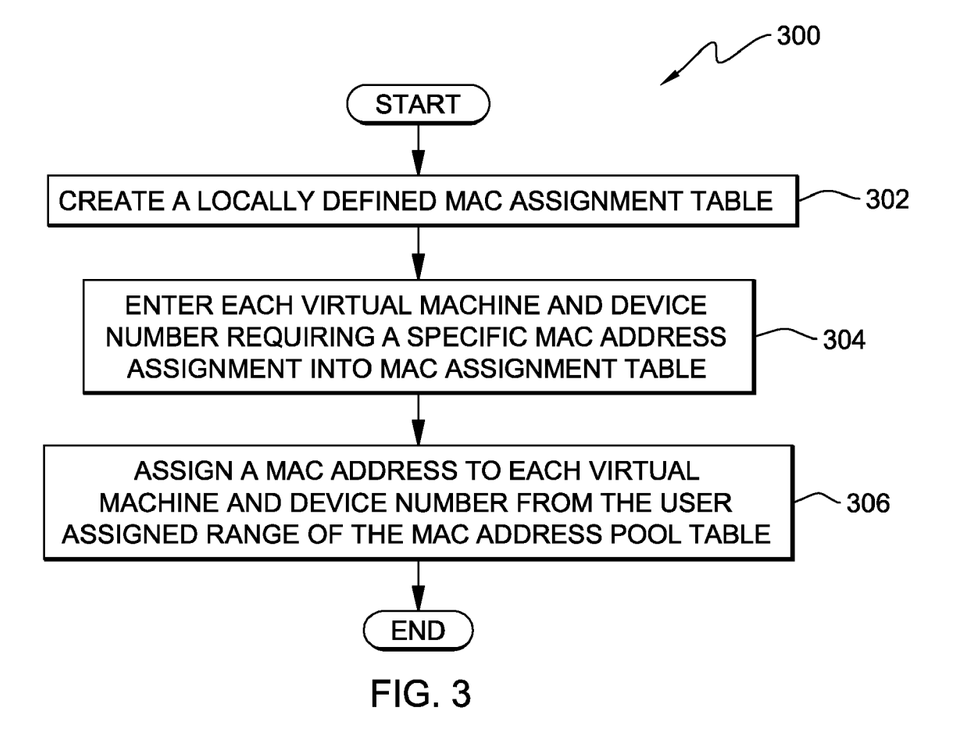
FIG. 3 depicts a flowchart illustrating a process implemented by the virtual machine operating system of FIG. 1 to define or create a MAC assignment table for managing assignment of locally-defined virtual physical addresses or virtual MAC addresses in a virtual machine operating system, in accordance with an embodiment of the present invention.

In another embodiment, the invention provides a method for managing assignment of locally-defined virtual physical addresses or virtual MAC addresses assigned to devices, in particular, real or tangible devices, as well as virtual devices defined in virtual machines in a virtual machine operating system environment. Reference is now made to FIGS. 2 and 3, which illustrate flowcharts outlining the steps for setting up a system 100 (as described in FIG. 1) for managing assignment of virtual physical addresses or virtual MAC addresses assigned to devices, in particular, virtual physical addresses or virtual MAC addresses assigned to real or tangible devices, as well as virtual devices used by virtual machines in a virtual machine environment, in accordance with an embodiment of the present invention. Turning to FIG. 2, reference numeral 200 outlines a method for creating a virtual physical address or virtual MAC address pool table (reference numeral 180 in FIG. 1) for managing assignment of virtual physical addresses or virtual MAC addresses assigned to real or tangible devices used by virtual machines in a virtual machine environment. In an embodiment, the creation of a virtual physical address pool table or a virtual MAC address pool table is a task that is performed by a person, such as, a system administrator, who configures the virtual machine operating system. In an embodiment, the administrator for control program 160 of the virtual machine operating system 120 begins creating a locally defined MAC address pool table in step 202. In step 204, the administrator for control program 160 defines in step 204 a set of all available locally-defined MAC addresses available in a MAC address pool table (reference numeral 180 in FIG. 1). Further, the administrator for control program 160 separates, in step 206, the available virtual MAC addresses into a system assigned range (reference numeral 182 in FIG. 1) and a user assigned range (reference numeral 184 in FIG. 1), ending the process of creating a virtual physical address pool table or virtual MAC address pool table.

Further, turning to FIG. 3, reference numeral 300, the administrator for control program 160 of the virtual machine operating system 120 (shown in FIG. 1) creates a virtual physical address assignment table or virtual MAC assignment table (reference numeral 170 in FIG. 1) for managing assignment of virtual physical addresses or virtual MAC addresses assigned to real or tangible devices, as well as virtual devices defined in the virtual machine operating system. In an embodiment, the creation of a virtual physical address assignment table or virtual MAC assignment table is a task that is performed by a person, such as, a system administrator, who configures the virtual machine operating system. In an embodiment, the administrator for control program 160 creates, in step 302, a virtual physical address assignment table or virtual MAC assignment table (reference numeral 170, shown in FIG. 1), which assigns a virtual physical address or virtual MAC address to a device having a virtual device number defined in the virtual machine. In step 304, the administrator for control program 160 of the virtual machine operating system 120 creates a MAC assignment table (reference numeral 170 in FIG. 1) by specifying the MACID option on a set of SET NIC commands for a set of given virtual machine names and device numbers or by including the MACID option on a NICDEF configuration statement that creates virtual devices. In each case, the administrator specifies a device number corresponding to a device attached to a virtual machine or a virtual device number, that is, the resulting MAC assignment table lists devices that require specific virtual physical address assignments or virtual MAC address assignments. In an embodiment, a device (either a tangible or real device or a virtual device) may be assigned a virtual device number that identifies the device in the virtual machine operating system 120. Further, in step 306, the administrator for control program 160 assigns a virtual physical address or virtual MAC address to a device having a virtual device number assigned to it and which device is attached to or defined for a specific guest or virtual machine in the virtual machine operating system. Moreover, the virtual physical address or virtual MAC address assigned or allocated to a device is assigned from the user assigned range (reference numeral 184) of the virtual physical address or virtual MAC address pool table (reference numeral 180 in FIG. 1), ending the process of creating a MAC assignment table. As shown in the resulting virtual physical address or virtual MAC assignment table 170, the table has three columns, a first column 172, which specifies the name of the virtual machine, a second column 174, which specifies the virtual device number associated with a device attached to or defined in the virtual machine operating system, and a third column 176, which specifies the virtual physical address or virtual MAC address allocated to a given device having a virtual device number (column 174) and a given virtual machine name (column 172). For instance, the virtual physical address or virtual MAC assignment table 170 shows that the user assigned virtual physical address or virtual MAC address 02-00-00-00-00-24 (reference numeral 179) has been allocated to the tangible OSA-E device attached to virtual machine VM150 (reference numeral 177), which tangible device is also assigned a virtual device number of 190 (reference numeral 178). Further, the virtual physical address assignment table or virtual MAC assignment table 170 shows that the user assigned virtual physical address or virtual MAC address 02-00-00-00-00-28 (reference numeral 191) has been allocated to the virtual device 162 having a virtual device number 162 (reference numeral 175) and which is attached to the virtual machine VM130 (reference numeral 173), whereas, the user assigned virtual physical address or virtual MAC address 02-00-00-00-00-22 has been allocated to the virtual device 166 having a virtual device number 166 and connected to the virtual machine VM140, as explained further herein below.

Accordingly, in an embodiment, a virtual physical address pool table or virtual MAC address pool table 180 is configured and stored within the virtual machine operating system. Further, in an embodiment, a configuration file stores all allocated and dynamically assigned virtual physical addresses or virtual MAC addresses within a general configuration file in the operating system memory space and does not harden them to a file or an external storage device. In an embodiment, the administrator for the control program allocates virtual physical addresses or virtual MAC addresses within the virtual physical address or virtual MAC address pool table by splitting or separating all available virtual physical addresses or virtual MAC addresses into a system assigned range 182 and a user assigned range 184. In the example shown in the virtual physical address pool table or virtual MAC address pool table in FIG. 1, the system assigned range of the virtual physical addresses or virtual MAC addresses comprises 02-00-00-00-00-01 through 02-00-00-00-00-20, whereas, the user assigned range comprises the address 02-00-00-00-00-21 through 02-00-00-00-00-FF. In an embodiment, only available virtual physical address in the system assigned range (02-00-00-00-00-01 through 02-00-00-00-00-20) may be dynamically assigned by the virtual machine operating system 120 to a device that has not yet been configured or defined in the virtual machine operating system. It is understood by one skilled in the art that the virtual physical address pool table or virtual MAC address pool table may be split according to other virtual physical address or virtual MAC address ranges within the available virtual physical address pool table or virtual MAC address pool table. Further, as shown in the virtual MAC address pool table 180, the MAC address pool table 180 provides an indication as to whether or not a particular virtual physical address or virtual MAC address is "in use" or is "free". For instance, the virtual physical address or virtual MAC address 02-00-00-00-00-24 (reference numeral 188) from the user assigned range of virtual MAC addresses is listed as being "free" (reference numeral 187), whereas, the virtual physical address or virtual MAC address 02-00-00-00-00-01 (reference numeral 189) from the system assigned range of virtual MAC addresses is listed as being "in use" (reference numeral 181). The MAC assignment table 170 and the MAC address pool table 180 (shown in FIG. 1) are discussed further herein below with respect to FIGS. 4A-4B and 5A-5B.

Figure 4A:
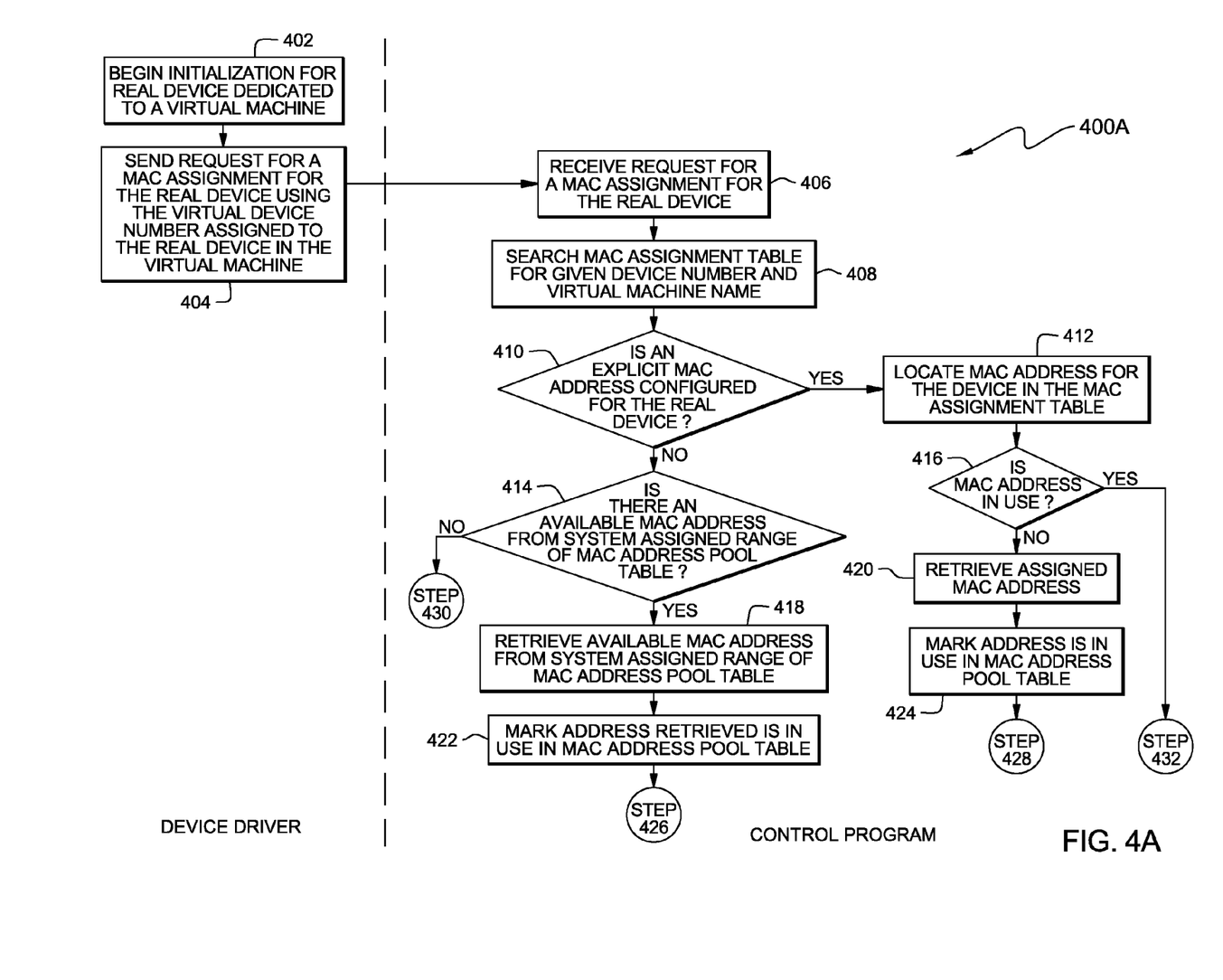
FIG. 4A-4B depict flowcharts illustrating a process implemented by the virtual machine operating system of FIG. 1 for assigning a virtual physical address or virtual MAC address to a real or tangible device dedicated to a virtual machine in a virtual machine operating system, in accordance with an embodiment of the present invention.
Figure 4B:
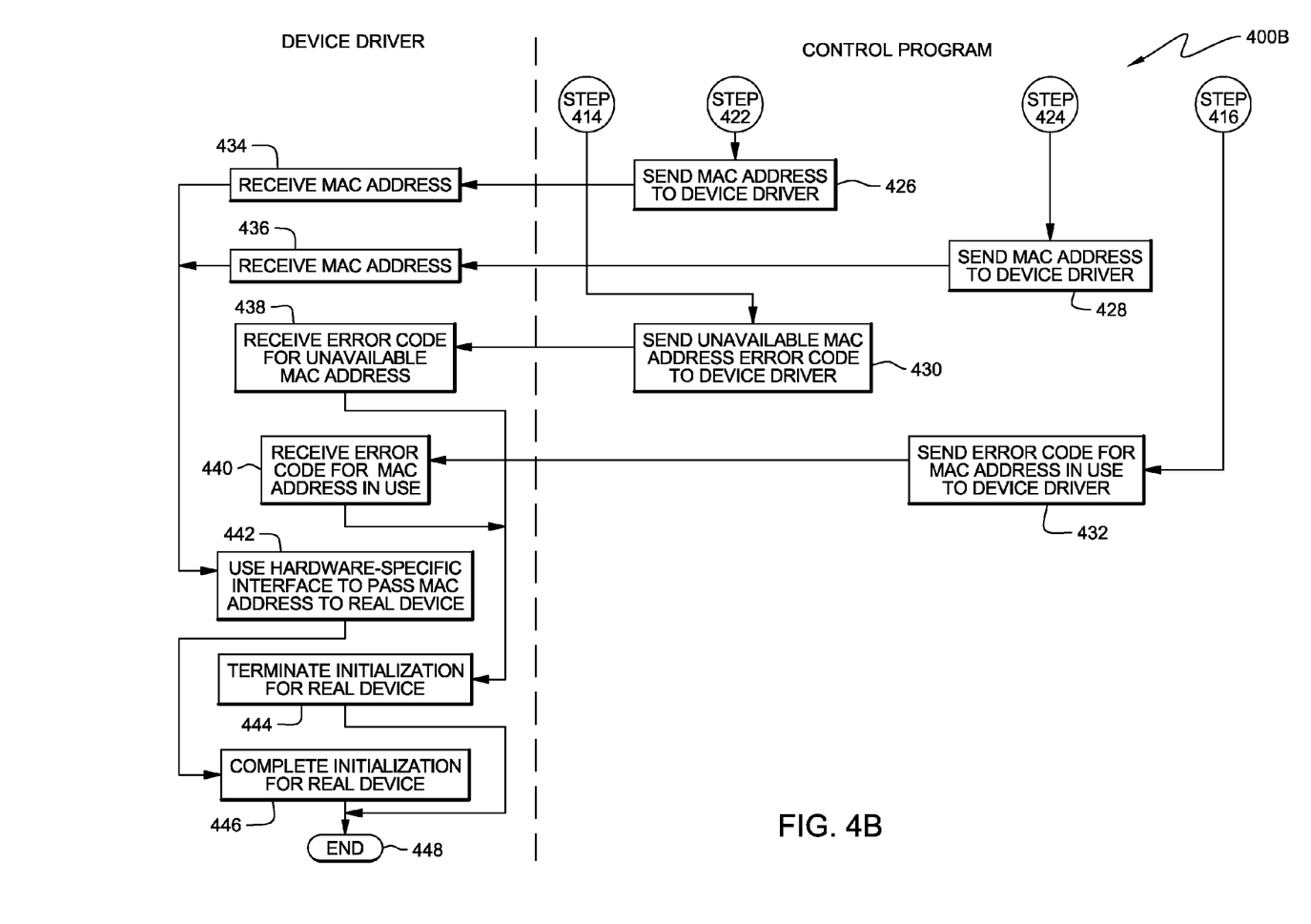
Figure 5A:
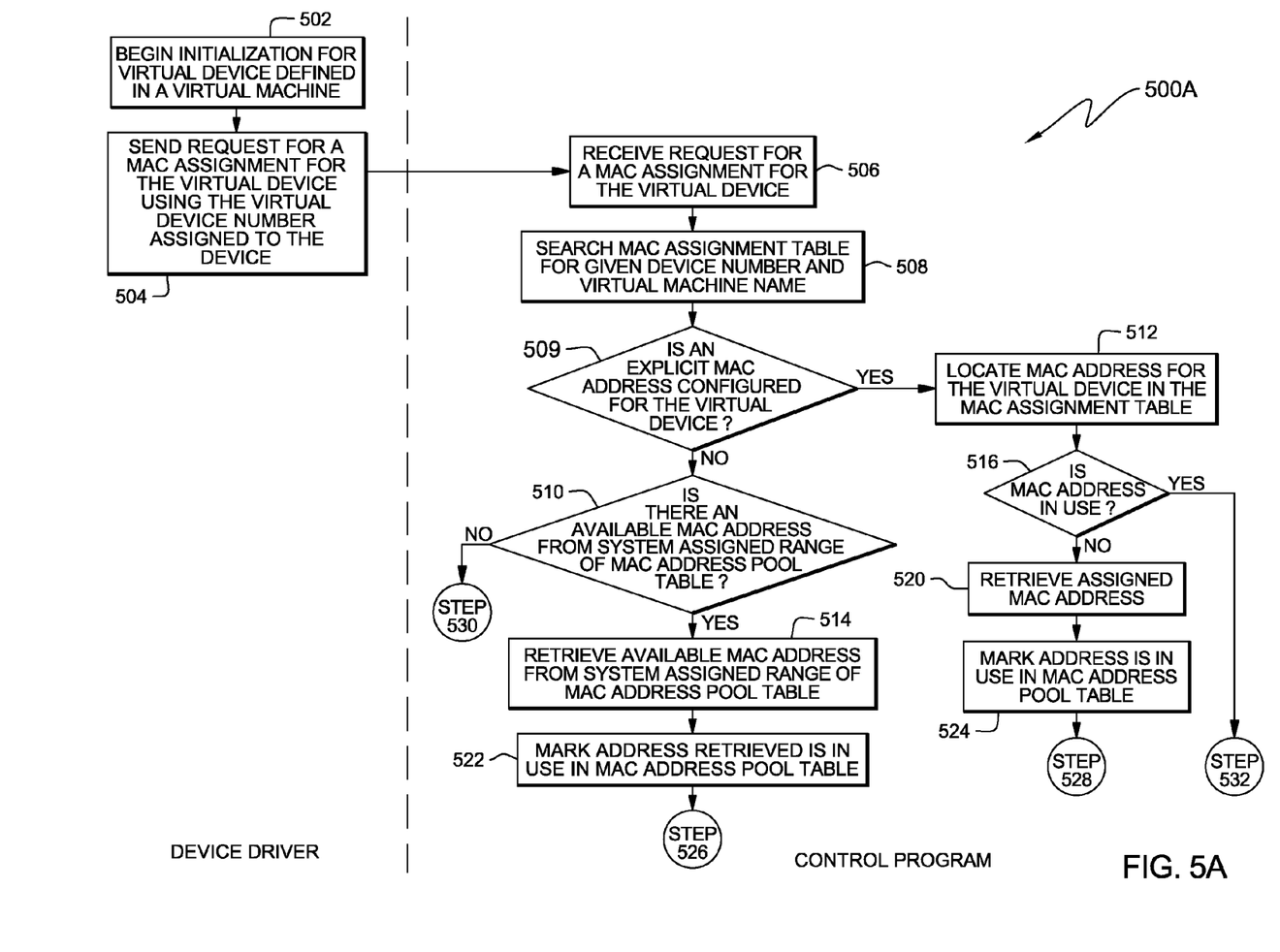
FIG. 5A-5B depict flowcharts illustrating a process implemented by the virtual machine operating system of FIG. 1 for assigning a virtual physical address or virtual MAC address to a virtual device defined in a virtual machine in a virtual machine operating system, in accordance with an embodiment of the present invention.
Figure 5B:
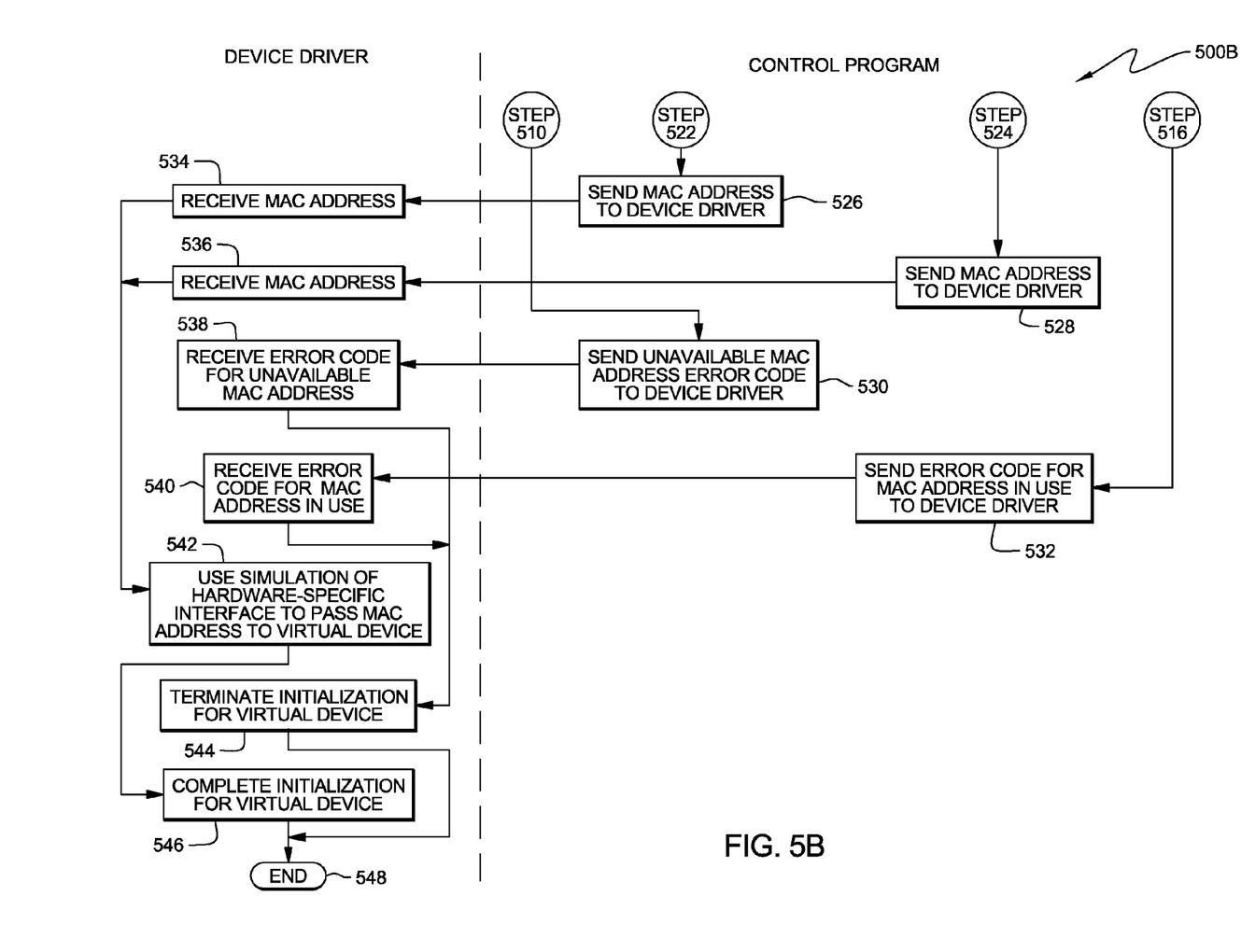

Reference is now made to FIGS. 4A-4B and FIGS. 5A-5B, where FIGS. 4A-4B together illustrate a process implemented by the control program or base portion 160 of the virtual machine operating system 120 (shown in FIG. 1) for assigning a locally-defined virtual physical address or virtual MAC address to a real or tangible device dedicated to a virtual machine, and where FIGS. 5A-5B together illustrate a process implemented by the virtual machine operating system (shown in FIG. 1) for assigning a locally-defined virtual physical address or virtual MAC address to a virtual device defined in a virtual machine, in accordance with an embodiment of the present invention. Turning to FIGS. 4A-4B, reference numerals 400A and 400B together illustrate a process implemented by the virtual machine operating system of FIG. 1 for assigning a locally-defined virtual physical address or virtual MAC address to a real or tangible device dedicated to a virtual machine in a virtual machine operating system, in accordance with an embodiment of the present invention. As outlined in FIG. 4A, a guest operating system device driver in a guest or virtual machine begins initialization (in step 402) for a dedicated real or tangible device. For example, referring to FIG. 1, the guest operating system 152 device driver 158 in virtual machine 150 begins initialization for a dedicated real or tangible device, such as, the OSA-E device 190 attached to virtual machine 150. The guest device driver 158 in the virtual machine 150 sends, in step 404 of FIG. 4A, a request to the control program 160 requesting a MAC assignment for the real or tangible device, namely, the OSA-E device 190, using a virtual device number 190 assigned to the tangible OSA-E device attached to the virtual machine 150. In an embodiment, the request includes the virtual machine name, column reference numeral 172 in table 170 of FIG. 1 (for example, VM150, reference numeral 177) and the virtual device number assigned to the real or tangible device (reference numeral 174 in table 170 in FIG. 1), for example, virtual device number 190 assigned to the OSA-E device (reference numeral 178) in table 170. The request for a MAC assignment for the OSA-E device 190 is received in step 406 by the control program 160 in the virtual machine operating system 120. In an embodiment, the request for a locally-defined virtual physical address or virtual MAC address is orchestrated through the MAC Address Services function (reference numeral 168 in FIG. 1), which comprises a DIAGNOSE instruction that is issued by the guest or virtual machine residing within the virtual machine operating system, which in an embodiment, comprises a z/VM operating system running on a zSeries mainframe computer. The control program searches, in step 408, the virtual physical address assignment table or virtual MAC assignment table 170 created in the base portion 160 of the virtual machine operating system 120 for the given virtual device number (in this example, device number 190) and virtual machine name (in this example, virtual device name VM150). The control program determines in step 410 whether or not an explicit locally-defined virtual physical address or virtual MAC address has been configured for the virtual machine VM150 and virtual device number 190 corresponding to the real or tangible device in the virtual MAC assignment table 170. If the control program determines that an explicit locally-defined virtual physical address or virtual MAC address has been configured for the real or tangible device, then in step 412, the control program locates or finds the locally-defined virtual physical address or virtual MAC address that has been configured or assigned to the real or tangible device in the virtual MAC assignment table 170. For instance, the control program determines from checking the virtual MAC assignment table 170 (shown in FIG. 1) that the given tangible device 190 (reference numeral 178) attached to virtual machine 150 (reference numeral 177) has been assigned the locally-defined virtual physical address or virtual MAC address of 02-00-00-00-00-24 (reference numeral 179) in the MAC Assignment column, reference numeral 176 of the MAC assignment table 170. As such, the control program further determines in step 416 whether or not the virtual MAC address located in the MAC assignment table 170 is indicated as being "in use" by checking in the MAC address pool table 180. For instance, by checking the virtual MAC address pool table 180, shown in FIG. 1, the control program determines in step 416 that the virtual MAC address 02-00-00-00-00-24 (reference numeral 188 in table 180) assigned to the real or tangible OSA-E device 190 is shown as being "free" (reference numeral 187 in table 180). Thus, the control program retrieves in step 420 the virtual MAC address that has been assigned to the real or tangible OSA-E device having device number 190 and further, the control program marks in step 424 the address in the virtual MAC address pool table 180 as being "in use". Further, the control program sends the MAC address to the device driver in step 428 and the device driver receives the MAC address in step 436. Going back to step 416, if the control program determines that the virtual MAC address is in use, then the process continues with step 432, where the control program sends an error code to the device driver indicating that the MAC address is in use. The error code is received by the device driver in step 440 and the device driver terminates initialization of the real device in step 444, ending the process at step 448. Further, by way of example, if the guest device driver 138 in the virtual machine 130 sends, in step 404 of FIG. 4A, a request to the control program 160 requesting a MAC assignment for the real or tangible device, namely, the OSA-E device 198, using a virtual device number 198 assigned to the tangible OSA-E device attached to the virtual machine 130, then the control program receives the request (in step 406) and searches (in step 408) the MAC assignment table 170 and determines in step 410 that the real or tangible OSA-E device 198 has not been assigned an explicit MAC address configured for the real OSA-E device having device number 198, given that the virtual device number 198 is not listed under the device number column 174. As such, in step 414, the control program determines whether or not there is an available virtual physical address or virtual MAC address from the system assigned range (reference numeral 182) of the virtual physical address or virtual MAC address pool table 180, shown in FIG. 1. If the control program determines in step 414 that there are no available free virtual physical addresses or virtual MAC addresses in the virtual physical address or virtual MAC address pool table, then the process continues with step 430 in FIG. 4B, where the control program sends (in step 430 of FIG. 4B) an error code message to the guest device driver that communicates to the guest device driver that a "free" virtual physical address or virtual MAC address is not available for assigning to the real or tangible device. The error message that a "free" virtual physical address or virtual MAC address is not available is received by the guest device driver in step 438 and the guest device driver terminates initialization for the tangible device in step 444, ending the process at step 448. However, going back to step 414, if the control program determines in step 414 that there are available free virtual physical addresses or virtual MAC addresses in the virtual MAC address pool table 180, then the control program retrieves in step 418 an available virtual physical address or virtual MAC address from the system assigned range 182 of the virtual physical address or virtual MAC address pool table 180. For instance, as shown in MAC address pool table 180, the system assigned virtual MAC address 02-00-00-00-00-02 (reference numeral 183) is shown as "free" (reference numeral 171). As such, the control program retrieves the free system MAC address 02-00-00-00-00-02 and further marks or changes (in step 422) the corresponding value for this address from "free" to being "in use". The process continues with step 426 in FIG. 4B, where the control program sends the locally-defined virtual physical address or virtual MAC address to the guest device driver, which is received by the guest device driver in step 434 (FIG. 4B). In an embodiment, the locally-defined virtual physical address or virtual MAC address is received by the guest device driver through the MAC Address Services function (reference numeral 168 in FIG. 1), which comprises a DIAGNOSE instruction issued by the guest or virtual machine residing with the virtual machine operating system, which in an embodiment, comprises a z/VM operating system running on a zSeries mainframe computer. Further, upon receipt of the retrieved virtual MAC address, in step 436, the guest device driver uses in step 442 a hardware-specific interface to pass the locally-defined virtual physical address or virtual MAC address retrieved for the real or tangible device to the real or tangible device and, further, completes initialization for the real or tangible device in step 446, ending the process at step 448.

Turning to FIGS. 5A-5B, reference numerals 500A and 500B together illustrate a process implemented by the virtual machine operating system of FIG. 1 for assigning a locally-defined virtual physical address or virtual MAC address to a virtual device defined in a guest or virtual machine in a virtual machine operating system, in accordance with an embodiment of the present invention. As outlined in FIG. 5A, a guest operating system device driver in a guest or virtual machine begins initialization (in step 502) for a virtual device defined in the virtual machine. For example, referring to FIG. 1, the guest operating system 132 device driver 138 in virtual machine 130 begins initialization for a virtual device, such as, the virtual NIC (Network Interface Card) device 162 defined in the virtual machine operating system 120. The guest device driver 138 in the virtual machine 130 sends, in step 504 of FIG. 5A, a request to the control program 160 requesting a virtual MAC assignment for the virtual device, namely, the virtual NIC device 162, using, for instance, the virtual device number 162 assigned to the virtual NIC 162 defined in the virtual machine 130. In an embodiment, the request includes the virtual machine name, in this example, VM130, column reference numeral 173 in table 170 of FIG. 1 and the virtual device number 162 assigned to the virtual device (reference numeral 175 in table 170 in FIG. 1) defined in the virtual machine 130. The request for a MAC assignment for the virtual device 162 is received in step 506 by the control program 160 in the virtual machine operating system 120. In an embodiment, the request for a locally-defined virtual physical address or virtual MAC address is orchestrated through the MAC Address Services function (reference numeral 168 in FIG. 1), which comprises a DIAGNOSE instruction that is issued by the guest or virtual machine residing within the virtual machine operating system, which in an embodiment, comprises a z/VM operating system running on a zSeries mainframe computer. The control program searches, in step 508, the virtual MAC assignment table 170 created in the base portion of the virtual machine operating system for the given virtual device number (in this example, device number 162) and virtual machine name (in this example, device name VM130). The control program determines in step 509 whether or not an explicit locally-defined virtual MAC address has been configured for the virtual machine VM130 and virtual device number 162 corresponding to the virtual device 162 in the virtual MAC assignment table 170. If the control program determines that an explicit locally-defined virtual MAC address has been configured for the virtual device 162, then in step 512, the control program locates or finds the locally-defined virtual MAC address that has been configured or assigned to the virtual device 162 in the virtual MAC assignment table 170. In an embodiment, the control program determines from searching the virtual MAC assignment table 170 (shown in FIG. 1) and locating the given virtual device number 162 (reference numeral 175) defined in the virtual machine 130 (reference numeral 173) that the virtual device 162 has been assigned the locally-defined virtual MAC address of 02-00-00-00-00-28 (reference numeral 191) in the MAC Assignment column, reference numeral 176 of the MAC assignment table 170. As such, the control program further determines in step 516 whether or not the virtual MAC address located in the virtual MAC assignment table 170 is in use by checking in the virtual MAC address pool table 180. For instance, by checking the virtual MAC address pool table 180, the control program determines in step 516 that the virtual device 162 having the locally-defined virtual MAC address of 02-00-00-00-00-28 (reference numeral 185 in table 180) is shown as being "free" (reference numeral 186). Thus, the control program retrieves in step 520 the virtual MAC address that has been assigned to the virtual device having device number 162 and further, the control program marks in step 524 the address in the virtual MAC address pool table 180 as being "in use". Further, the control program sends the MAC address to the device driver in step 528 and the device driver receives the MAC address in step 536. Further, going back to step 509, if the control program determines that an explicit locally-defined virtual physical address or virtual MAC address has not been configured for the virtual device 162, then in step 510, the control program determines whether or not there is an available virtual MAC address from the system assigned range (reference numeral 182) of the virtual MAC address pool table 180 shown in FIG. 1. If the control program determines in step 510 that that there are no available free virtual MAC addresses in the virtual MAC address pool table 180, then the process continues with step 530 in FIG. 5B, where the control program sends (in step 530 of FIG. 5B) an error code message to the guest device driver that communicates to the guest device driver that a "free" virtual physical address or virtual MAC address is not available for assigning to the virtual device. The error message that a "free" virtual physical address or virtual MAC address is not available is received by the guest device driver in step 538 and the guest device driver terminates initialization for the virtual device in step 544, ending the process at step 548. By way of another example, when the device driver 138 in the virtual machine 130 sends, in step 504 of FIG. 5A, a request to the control program 160 requesting a MAC assignment for the virtual NIC device 164 defined in virtual machine 130, the control program receives the request (in step 506) and searches (in step 508) the MAC assignment table 170 and determines in step 509 that the virtual device 164 has not been assigned an explicit MAC address, given that the virtual device number 164 is not listed under the device number column 174. As such, in step 510, the control program determines whether or not there is an available virtual MAC address from the system assigned range (reference numeral 182) of the virtual MAC address pool table 180, shown in FIG. 1. However, going back to step 510, if the control program determines in step 510 that there are available free virtual MAC addresses in the virtual MAC address pool table 180, then the control program retrieves in step 514 an available virtual MAC address from the system assigned range 182 of the virtual MAC address pool table 180. For instance, the control program checks the virtual MAC address pool table 180 and verifies that virtual MAC address 02-00-00-00-00-02 (reference numeral 183 in table 180) is shown as being "free" (reference numeral 171). The control program retrieves in step 514 the free virtual MAC address from the system assigned range of the MAC address pool table 180 and, further, the control program marks (in step 522) the virtual MAC address 02-00-00-00-00-02 retrieved as being "in use" in the virtual MAC address pool table 180 and the process continues with step 526 in FIG. 5B, where the control program sends (in step 526) the locally-defined virtual MAC address retrieved to the guest device driver 138, which is received by the guest device driver in step 534 (FIG. 5B). In an embodiment, the locally-defined virtual MAC address is received by the guest device driver through the MAC Address Services function (reference numeral 168 in FIG. 1), which comprises a DIAGNOSE instruction issued by the guest or virtual machine residing with the virtual machine operating system, which in an embodiment, comprises a z/VM operating system running on a zSeries mainframe computer. Further, in step 542 of FIG. 5B, the guest device driver uses simulation of a hardware-specific interface to pass the locally-defined virtual physical address or virtual MAC address retrieved for the virtual device to the virtual device and, further, completes initialization for the virtual device in step 546, ending the process at step 548. Going back to step 516, if the control program determines that the explicit MAC address located in the MAC assignment table 170 is shown as being "in use" in the MAC address pool table 180, then the process continues with step 532 in FIG. 5B, where the control program sends (in step 532 of FIG. 5B) an error code message to the guest device driver that communicates to the guest device driver that the located virtual MAC address assigned to the virtual device is in use. The guest device driver receives in step 540 the error code message indicating that the virtual physical address or virtual MAC address is in use and, thus, the guest device driver terminates in step 544 initialization of the virtual device, ending the process in step 548.

Accordingly, the invention provides the ability to allocate and dynamically assign locally-defined virtual MAC addresses within the virtual machine operating system memory space without using the hardened or burned-in virtual physical addresses or virtual MAC addresses of the device. The invention uses an operating system service that does not serve virtual MAC addresses through the network, but instead orchestrates address requests and assignments using a callable function issued by the virtual machine residing within the operating system. As such, the invention teaches a method for generating and maintaining locally-defined MAC addresses that are not related to the "burned in" MAC address of a device and can be deployed for any Layer 2 configuration. Moreover, in the invention, a locally-defined MAC address is used for identification and forwarding of Ethernet frames and IP packets to and from the virtual machine. Given that the invention utilizes an operating system service that does not serve MAC addresses through the network, the locally-defined MAC addresses assigned to virtual machines can be used or deployed across any real or virtual adapter assigned to the virtual machine, irrespective of the internal "burned in" hardware MAC address of the actual adapter. Rather, address request and assignments are orchestrated through a system instruction issued by a virtual machine residing within the operating system. Further, in the invention, all allocated and dynamically assigned MAC addresses are stored within the operating system memory space and are not hardened to a file or some external storage device. Accordingly, the z/VM operating system provides a system administrator the capability of assigning a locally-defined MAC address to a real device attached to a virtual machine through the use of a general purpose configuration file that provides information for a large array of system-level attributes.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for managing assignment of virtual physical addresses in a virtual machine operating system, said method comprising the steps of:

requesting, using a services function provided by said virtual machine operating system, a virtual physical address assignment for a device dedicated to a virtual machine in said virtual machine operating system, wherein said device comprises a tangible device;

searching, in a virtual physical address assignment table stored within a memory space of said virtual machine operating system, to determine whether or not an explicit virtual physical address is assigned to said device;

if said explicit virtual physical address is determined to be assigned to said device, retrieving said explicit virtual physical address from said virtual physical address assignment table upon verifying that said explicit virtual physical address is not in use by another device; and forwarding, using said services function provided by said virtual machine operating system, said explicit virtual physical address retrieved for assignment to said device, wherein said explicit virtual physical address forwarded is assigned to said tangible device dedicated to said virtual machine in said virtual machine operating system.

2. A method according to claim 1, further comprising the steps of:

if said explicit virtual physical address is not assigned to said device, retrieving an available virtual physical address from a virtual physical address pool table; and forwarding, using said services function, said available virtual physical address retrieved from said virtual physical address pool table to said virtual machine operating system, wherein said available virtual physical address forwarded is assigned to said tangible device dedicated to said virtual machine in said virtual machine operating system.

3. A method according to claim 1, wherein said tangible device is assigned a virtual device number and wherein said requesting step further comprises the step of:

starting device initialization for said tangible device using a virtual device driver for said tangible device dedicated to said virtual machine in said virtual machine operating system.

4. A method according to claim 2, wherein said retrieving said explicit virtual physical address from said virtual physical address assignment table step further comprises the step of:

verifying in said virtual physical address pool table whether or not said explicit virtual physical address is in use by said another device; and if said explicit virtual physical address is not in use by said another device, marking in said virtual physical address pool table said explicit virtual physical address as being used by said tangible device before forwarding said explicit virtual physical address to said virtual device driver using said services function provided by said virtual machine operating system.

5. A method according to claim 2, wherein said retrieving said explicit virtual physical address from said virtual physical address assignment table step further comprises the steps of:
  verifying in said virtual physical address pool table whether or not said explicit virtual physical address is in use by said another device; and
  if said explicit virtual physical address is in use by said another device, returning an error to said virtual device driver of said virtual machine operating system.

6. A method according to claim 2, wherein said available virtual physical address retrieved from said virtual physical address pool comprises a system assigned virtual physical address.

7. A method according to claim 6, wherein said retrieving said available virtual physical address from said virtual physical address pool table further comprises:
  determining whether or not said system assigned virtual physical address is available in said virtual physical address pool table; and
  if said system assigned virtual physical address is available, marking in said virtual physical address pool table said system assigned virtual physical address as being used by said device before forwarding said system assigned virtual physical address to said virtual device driver calling routine of said base portion of said virtual machine operating system.

8. A method according to claim 7, wherein if said system assigned virtual physical address is not available, returning an error to said virtual device driver of said virtual machine operating system.

9. A computer system for managing assignment of virtual physical addresses in a virtual machine operating system, comprising:
  a central processing unit;
  first instructions to request a virtual physical address assignment for a device dedicated to a virtual machine in said virtual machine operating system, said device having a virtual device number and comprising at least one of: a real device and a virtual device;
  second instructions to search a virtual physical address assignment table stored within a memory space of said virtual machine operating system to determine whether or not an explicit virtual physical address is assigned to said device having said virtual device number, wherein said second instructions include instructions to retrieve said explicit virtual physical address from said virtual physical address assignment table, in response to a determination that said explicit virtual physical address is determined to be assigned to said device and in response to verification that said explicit virtual physical address is not in use by another device;
  third instructions to forward said explicit virtual physical address retrieved, using a services function of said virtual machine operating system, said third instructions including instruction to assign said explicit virtual physical address retrieved and verified to said device, and wherein said first, second and third instructions are stored in said computer system for execution by said central processing unit.

10. The computer system according to claim 9, further comprising:
  fourth program instructions to retrieve an available virtual physical address from a virtual physical address pool table, responsive to a determination that said explicit virtual physical address is not assigned to said device, and to forward said available virtual physical address retrieved from said virtual physical address pool table, using said services function of said virtual machine operating system, wherein said available virtual physical address retrieved from said virtual physical address pool comprises a system assigned virtual physical address, and wherein said available virtual physical address forwarded is assigned to said device, and wherein said fourth program instructions are stored in said computer system for execution by said central processing unit.

11. The computer system according to claim 10, wherein said first program instructions include instructions to start device initialization for said device using a device driver of said virtual machine operating system and to request said virtual physical address assignment for said device using said services function of said virtual machine operating system.

12. The computer system according to claim 11, wherein said second program instructions include instructions to verify in said virtual physical address pool table whether or not said explicit virtual physical address is in use by said another device and if said explicit virtual physical address is not in use by said another device, to mark in said virtual physical address pool table said explicit virtual physical address as being used by said device before forwarding said explicit virtual physical address to said virtual device driver of said virtual machine operating system.

13. The computer system according to claim 12, wherein said second program instructions include instructions to determine whether or not a system assigned virtual physical address is available in said virtual physical address pool table and if said system assigned virtual physical address is available, to mark in said virtual physical address pool table said system assigned virtual physical address as being used by said device before forwarding said system assigned virtual physical address to said virtual device driver of said virtual machine operating system.

14. The computer system according to claim 13, wherein said second program instructions include instructions to return an error to said virtual device driver of said virtual machine operating system, if said system assigned virtual physical address is not available.

15. A computer program product for managing assignment of virtual physical addresses in a virtual machine operating system, said computer program product comprising:
  a non-transitory computer readable medium;
  first instructions to request, using a services function within said virtual machine operating system, a virtual physical address assignment for a device dedicated to a virtual machine in said virtual machine operating system, said device comprising a real device and having assigned a virtual device number;
  second instructions to search a virtual physical address assignment table stored within a memory space of said virtual machine operating system to determine whether or not an explicit virtual physical address is assigned to said real device having said virtual device number, wherein said second instructions include instructions to retrieve said explicit virtual physical address from said virtual physical address assignment table if said explicit virtual physical address is determined to be assigned to said real device and to verify that said explicit virtual physical address is not in use by another device;
  third instructions to forward, using said services function within said virtual machine operating system, said explicit virtual physical address retrieved for assignment to said real device, and wherein said first, second and third instructions are recorded on said non-transitory computer readable medium.

16. The computer program product according to claim 15, further comprising:

fourth program instructions to retrieve an available virtual physical address from a virtual physical address pool table, if said explicit virtual physical address is not assigned to said real device, and to assign said available virtual physical address retrieved to said real device, wherein said available virtual physical address retrieved from said virtual physical address pool comprises a system assigned virtual physical address, and wherein said fourth program instructions are recorded on said non-transitory computer readable medium.

17. The computer program product according to claim 16, wherein said first program instructions include instructions to start device initialization for said real device using a virtual device driver of said virtual machine operating system and to request said virtual physical address assignment for said real device using said services function of said virtual machine operating system.

18. The computer program product according to claim 17, wherein said second program instructions include instructions to verify in said virtual physical address pool table whether or not said explicit virtual physical address is in use by said another device and if said explicit virtual physical address is not in use by said another device, to mark in said virtual physical address pool table said explicit virtual physical address as being used by said real device before forwarding said explicit virtual physical address to said virtual device driver of said virtual machine operating system.

19. The computer program product according to claim 18, wherein said second program instructions include instructions to determine whether or not a system assigned virtual physical address is available in said virtual physical address pool table and if said system assigned virtual physical address is available, to mark in said virtual physical address pool table said system assigned virtual physical address as being used by said real device before forwarding said system assigned virtual physical address to said virtual device driver of said virtual machine operating system.

20. The computer program product according to claim 19, wherein said second program instructions include instructions to return an error to said calling routine of said base portion of said virtual machine operating system, if said system assigned virtual physical address is not available.

\* \* \* \* \*